(12) United States Patent
Chapman et al.

(10) Patent No.: US 9,670,809 B2
(45) Date of Patent: Jun. 6, 2017

(54) APPARATUS AND METHOD FOR SKINNING ARTICLES

(71) Applicant: Corning Incorporated, Corning, NY (US)

(72) Inventors: Thomas Richard Chapman, Painted Post, NY (US); John Paul Bir Singh, Painted Post, NY (US); Amber Leigh Tremper, Horseheads, NY (US); Srinivasa Rao Vaddiraju, Painted Post, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 219 days.

(21) Appl. No.: 14/083,722

(22) Filed: Nov. 19, 2013

(65) Prior Publication Data
US 2015/0135667 A1    May 21, 2015

(51) Int. Cl.
*B05C 3/02*     (2006.01)
*F01N 3/022*    (2006.01)
*G05B 15/02*    (2006.01)
*B05C 5/02*     (2006.01)
*H01B 13/16*    (2006.01)
(Continued)

(52) U.S. Cl.
CPC ............ *F01N 3/0222* (2013.01); *B05C 5/027* (2013.01); *B28B 19/0038* (2013.01); *B29C 47/0028* (2013.01); *B29C 47/027* (2013.01); *B29C 47/028* (2013.01); *B29C 47/92* (2013.01);
(Continued)

(58) Field of Classification Search
USPC ............... 118/300, 313–315, 404, 407–412; 264/629–631; 55/523
See application file for complete search history.

(56) References Cited

U.S. PATENT DOCUMENTS 2,820,249 A    1/1958  Colombo
4,150,929 A    4/1979  Brandt et al. ................. 425/114
(Continued)

FOREIGN PATENT DOCUMENTS

FR    2625941        7/1989
JP    59-071844      4/1984     ............... B29H 9/12
(Continued)

OTHER PUBLICATIONS

PCT/US2014/064043 Search Report Nov. 5, 2014.
(Continued)

*Primary Examiner* — Yewebdar Tadesse
(74) *Attorney, Agent, or Firm* — Joseph M. Homa (57) ABSTRACT

A skinning apparatus and a method of skinning a porous ceramic. The apparatus includes an axial skinning manifold. The axial skinning manifold includes a curved adaptive pipe to flow cement in a circumferential direction from an inlet at a first position and through an adaptive opening along an inner bend of the curve through a land channel disposed along the inner bend. The land channel emits the cement at a constant velocity from a land opening extending proximate the first position to a second position spaced apart from the first position. The land outlet emits cement at a constant velocity around the outer periphery of the porous ceramic to dispose a uniform skin thereon as the porous ceramic moves axially relative to the land outlet.

10 Claims, 10 Drawing Sheets

(51) Int. Cl.
    *C04B 41/85*     (2006.01)
    *B28B 19/00*     (2006.01)
    *B29C 47/00*     (2006.01)
    *B29C 47/02*     (2006.01)
    *B29C 47/92*     (2006.01)

(52) U.S. Cl.
    CPC .............. *C04B 41/85* (2013.01); *G05B 15/02* (2013.01); *H01B 13/16* (2013.01)

(56) References Cited

U.S. PATENT DOCUMENTS

| | | | |
|---|---|---|---|
| 5,401,454 A | 3/1995 | Mendel | 264/176.1 |
| 6,190,152 B1 | 2/2001 | Cree | 425/133.1 |
| 6,551,535 B2 | 4/2003 | Sander | 264/39 |
| 6,926,858 B2 | 8/2005 | Cree | 264/514 |
| 8,142,859 B2 | 3/2012 | Domey et al. | 427/427 |
| 9,132,578 B2 * | 9/2015 | Anthony | B05C 5/0208 |
| 2002/0006471 A1 | 1/2002 | Ohira et al. | 427/356 |
| 2002/0100994 A1 | 8/2002 | Sander | 264/102 |
| 2009/0020909 A1 | 1/2009 | Shirai et al. | 264/250 |
| 2009/0297765 A1 | 12/2009 | Dome et al. | 428/116 |
| 2013/0136866 A1 | 5/2013 | Anthony et al. | 427/424 |

FOREIGN PATENT DOCUMENTS

| | | |
|---|---|---|
| JP | 2007045020 | 2/2007 |
| JP | 2008119604 | 5/2008 |
| WO | 2006041101 | 4/2006 |
| WO | 2007001012 | 1/2007 |
| WO | 2013/082061 | 6/2013 |

OTHER PUBLICATIONS

WO2007001012—machine translation.
JP2007045020—machine translation.
W. A Gifford, "The Effect of Wall Slip on the Performance of Flat Extrusion Dies", Polymer Engineering and Science, Nov. 2001, vol. 41, No. 11, pp. 1886-1892.
JP2008119604—machine translation.

* cited by examiner

APPARATUS AND METHOD FOR SKINNING ARTICLES

CROSS REFERENCE TO RELATED APPLICATIONS

This application is related to commonly owned and assigned U.S. patent applications: Ser. No. 61/564,395, filed Nov. 29, 2011, now U.S. patent application Ser. No. 13/463, 125, filed May 3, 2012, entitled "Apparatus and Method for Skinning Articles," Ser. No. 61/828,363, filed May 29, 2013, entitled "Method And System For Control Of An Axial Skinning Apparatus," and Ser. No. 61/891,147, filed Oct. 15, 2013, entitled "Process for Axial Skinning Apparatus," the content of which is relied upon and incorporated herein by reference in its entirety, but does not claim priority thereto.

BACKGROUND

Field

Exemplary embodiments of the present disclosure relate to axial skinning apparatus, methods of axial skinning and skinned porous ceramic honeycomb articles.

Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters (generically referred to herein as honeycomb bodies) may be used in these applications.

Particulate filters and substrates with large diameters may be difficult to manufacture to external dimensional requirements set by original equipment manufacturers (OEMs) and the supply chain due to drying and firing shrinkage during manufacturing. Consequently, ceramic cement may be used to form an exterior skin of a honeycomb body which has been machined or "contoured" to a desired dimension. As used herein, the term "honeycomb body" includes honeycomb monoliths and honeycomb bodies formed by multiple honeycomb segments that are secured together, such as by using a ceramic cement. Ceramic cement may be mixed and applied to a fired, contoured or segmented honeycomb body and the wet skin allowed to dry. The act or process of applying ceramic cement to the exterior of the honeycomb body is referred to herein as "skinning" the honeycomb body.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide axial skinning apparatus.

Exemplary embodiments of the present disclosure also provide a method for axial skinning porous ceramic honeycomb articles.

Exemplary embodiments of the present disclosure also provide skinned porous ceramic honeycomb articles.

Additional features of the disclosure will be set forth in the description which follows, and in part will be apparent from the description, or may be learned by practice of the disclosure.

An exemplary embodiment discloses a skinning apparatus. The skinning apparatus includes a skinning manifold to apply a uniform cement skin to an outer peripheral surface of a porous ceramic body as the body is axially moved through the manifold (referred to herein as "axial skinning"). The axial skinning manifold includes a curved adaptive pipe comprising a length to flow cement in a circumferential direction, an inlet to accept cement at a first position of the length and an adaptive opening along an inner bend of the length to emit cement. The axial skinning manifold includes a land disposed along the inner bend of the length of the adaptive pipe comprising a land channel at the adaptive opening to accept the cement, extending from the adaptive opening to an inner circumference land opening to equilibrate cement pressure along the land opening and dispose the cement on the outer peripheral surface of the porous ceramic at a constant velocity. The skinning apparatus also includes a source of motive force to controllably urge the porous ceramic into and through the manifold.

An exemplary embodiment also discloses a method of skinning a porous ceramic honeycomb article. The method includes providing cement at a pressure to an inlet of a circumferentially curved adaptive pipe of an axial skinning manifold, flowing the cement circumferentially through the circumferentially curved adaptive pipe from the inlet to a position distant from the inlet, simultaneously flowing the cement radially through an adaptive pipe opening in an inner circumference wall of the adaptive pipe and along a land channel to an inner circumference land opening of the axial skinning manifold, contacting an outer peripheral wall of the porous ceramic honeycomb article with the cement at a constant velocity, the velocity being constant from a first position of the land opening proximate the inlet to a second position of the land opening proximate the position distant from the inlet.

An exemplary embodiment also discloses a porous ceramic honeycomb article comprising a skin applied to the outer peripheral wall by the method for skinning a porous ceramic honeycomb article.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity. It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In these exemplary embodiments, the disclosed apparatus or system, and the disclosed method of using the apparatus for skinning ceramic parts provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

"Unipipe" refers to a central structure of the apparatus that is adapted to receive a porous ceramic, such as honeycomb body and further adapted to receive flowable cement from a cement source and to deliver the cement to the surface of the ceramic part within the unipipe to produce the skinned part. For ease of description, the porous ceramic, such as honeycomb body, will be referred to as a part. The ceramic part received may be un-skinned, contoured, include a base skin to be over-skinned, and the like. Contoured refers to a part shaped to particular dimensions and tolerances, for example, by grinding, cutting, or the like. For ease of description, the received part will be referred to as un-skinned.

"Tailpipe" refers to the out bound or exit portion of the unipipe and where the part is bearing skin.

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "RT" for room temperature, "nm" for nanometers, and like abbreviations).

Specific and preferred values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, more specific values, and preferred values described herein.

Substrate and filter articles are used in gasoline and diesel, light duty and heavy duty vehicles for after treatment emission control, and which control satisfies environmental regulations. One of the steps in the production of these substrates and filters is the application of a cement-based skin or outer wall on the outer peripheral axial surface of the substrates and filters.

The skin on a part, such as ceramic filter article, is the interface between the part and the surroundings. The skin serves several advantageous functions, for example, the skin adds to the aesthetics of the part and is valued by customers as an indicator of quality, protects the part's functional filter portion from structural degradation such as chipping damage, and other hazards surrounding the part, in manufacture and use, such as in handling and transport of the part, and adds to the isostatic strength of the part, which is a significant performance metric for modern parts.

For substrates and filters, the skin can be applied during the finishing process. The conventional skinning process is labor intensive and has a relatively low material utilization of about 30 to 50%, which can add to the operating and manufacturing costs of the part.

In the aforementioned commonly owned and assigned copending U.S. patent application Ser. No. 13/463,125, an automated or robotic axial skinning apparatus and method is disclosed. The part to be skinned can optionally be first contoured or shaped, and then inserted into a tube (unipipe) or skinning chamber having a diameter that is slightly larger than the part. The annular cavity (i.e., annulus) between the part and the tube is filled with flowable skinning cement and then the part, by relative motion, is 'pushed' or urged in the axial direction through the skinning chamber. As the part emerges from the other end of the skinning chamber, the part has a uniform amount of cement on its surface (skin). The wet skin can then be dried to obtain a functional skin.

Figure 1:
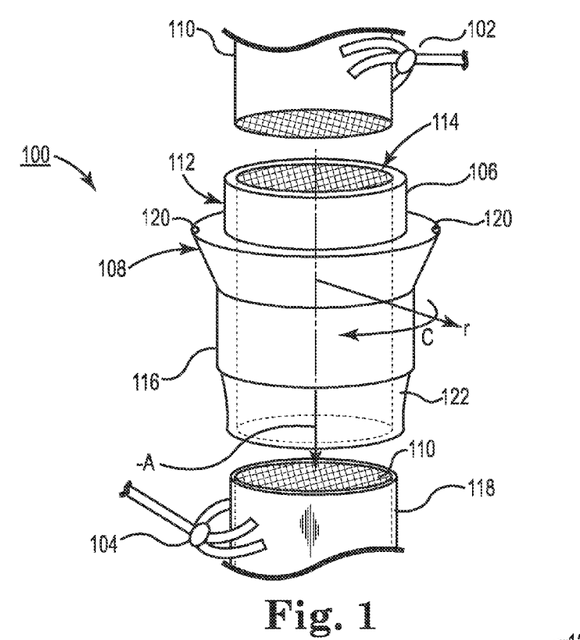
FIG. 1 depicts a schematic of an axial skinning apparatus according to exemplary embodiments of the disclosure.

FIG. 1 depicts a schematic of an axial skinning apparatus according to exemplary embodiments of the disclosure. In FIG. 1, circumferential direction is indicated by arrow "C", radial direction is indicated by arrow "r", and axial direction is indicated by arrow "A". These directions may be used to describe various elements and relationships among elements regardless of the element's shape. The axial skinning apparatus 100 can include a source of motive force 102, 104, a unipipe 106, and a manifold 108. The source of motive force 102, 104 can provide relative motion between the part and the skinning apparatus, and can be mechanical, hydraulic, robotic, manual, or the like, to move the part to be skinned 110 axially through the unipipe 106. The unipipe 106 includes a sidewall 112 to circumferentially surround an outer periphery of the part 110 and an opening 114 to receive the part to be skinned 110. The inner surface of the sidewall 112 may guide the part 110 through the skinning apparatus and provide the flowable cement to the outer periphery of the part 110 with a predetermined sticking pressure. The unipipe 106 has a tailpipe 116 where the part 110 having cement uniformly disposed thereon exits the unipipe 106. A portion of the part 110 may exit the tailpipe 116 supporting a uniform skin 118 while a portion of the part 110 is still being axially coated with the flowable cement.

The part to be skinned 110 is shown as having a circular or elliptical cross section, that is, as a cylinder shape; however this disclosure is not so limited. The part to be skinned 110 may have other cross sectional shapes and the unipipe 106 may have the same cross sectional shape as the part 110 but at a larger cross sectional area to uniformly accommodate the skin 118 between the outer periphery of the part 110 and the interior surface of the unipipe 106.

The manifold 108 includes an inlet 120 to receive cement at a predetermined pressure. The cement flows to the interior of the unipipe 106 and uniformly contacts the outer periphery of the part 110. As illustrated in FIG. 1, the part to be skinned 110 enters the unipipe 106 from the top and exits bearing skin 118 at the bottom of unipipe 106, however this disclosure is not so limited. That is, in alternative exemplary embodiments the part to be skinned 110 can enter the unipipe 106 from below and exit the unipipe 106 at the top bearing skin 118.

Figure 2A:
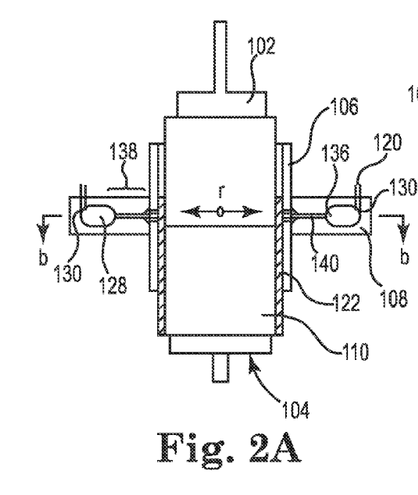
FIG. 2A depicts a side cross sectional view and FIG. 2B depicts a top sectional view through axial skinning apparatus according to exemplary embodiments of the disclosure.
Figure 2B:
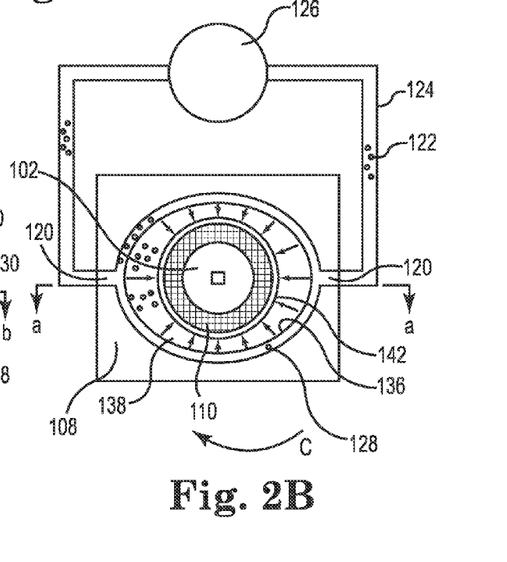
Figure 2C:
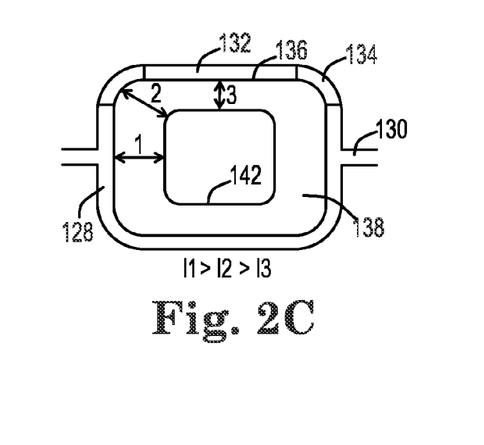
FIGS. 2C and 2D depict top sectional views through axial skinning apparatus according to exemplary embodiments of the disclosure.
Figure 2D:
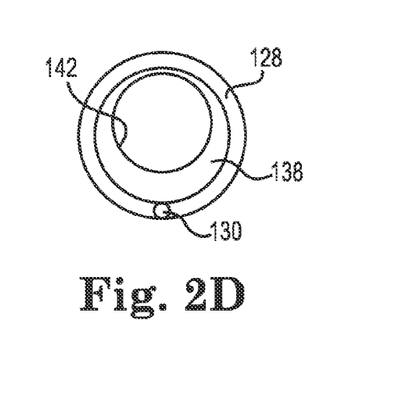

FIGS. 2A and 2B show cross-sectional schematics of the skinning apparatus 100 according to these exemplary embodiments. Skin cement 122 is fed into the manifold 108 through feed pipes 124 from a pressure tank 126 maintained at a determined pressure set point. The skin cement 122 enters the manifold at inlet 120. The inlet 120 can be an inlet to an adaptive pipe 128 of the manifold 108. Alternatively, the manifold inlet 120 can be spaced apart from the adaptive pipe inlet 130. The adaptive pipe 128 can be curved in a circumferential direction "C". The curved adaptive pipe 128 can include a pipe, channel, tube, or the like, having straight sections 132 and bends 134 as illustrated in FIG. 2C. The straight sections 132 may have some gradual amount of circumferential curvature and the bends 134 may have various more pronounced curvatures such as 15° to 90° elbows. As will become clear with further description, the circumferential shape of the adaptive pipe 128 depends on the shape of the part to be skinned 110. For example, when the part to be skinned has a circular cross section, the adaptive pipe 128 may extend in an ellipse with two inlets 130 (FIG. 2B) or an offset circle with only one inlet 130 (FIG. 2D), when the part to be skinned has a square-like cross section, the adaptive pipe 128 may extend in a rectangular-like circumferential path with two inlets 130 (FIG. 2C).

The adaptive pipe 128 includes an adaptive opening 136 along an inner sidewall. The inner sidewall can be along an inner bend of the adaptive pipe 136. The adaptive opening 136 may be a slot or opening extending the entire length of the adaptive pipe 128 inner sidewall facing toward the part to be skinned 110. The adaptive pipe 128 and adaptive opening 136 adapt the flow of cement 122 from the feed pipe 124 to around the periphery of the part to be skinned 110. The skin cement 122 enters the adaptive pipe 128 at inlet 130 and flows circumferentially through the adaptive pipe 128. Simultaneously, the skin cement 122 flows radially in the negative direction indicated by arrow "r" through the adaptive pipe opening 136.

The manifold 108 includes a land 138 disposed circumferentially inside the adaptive pipe 128. The land 138, described in more detail below, includes a land channel 140 to transfer the skin cement 122 from the adaptive pipe opening 136 to the interior of the unipipe 106. As shown in FIGS. 2A, 2B, 2C, and 2D, the land 138 can vary in length from greatest near the adaptive pipe inlet 130 to least farthest from the adaptive pipe inlet 130. The land channel 140 can include a land opening 142 to emit skin cement 122 at a constant velocity on the outer peripheral surface of the part 110.

A platen 102 can be used to push the parts to be skinned 110 through the unipipe 106 and the pusher 102 can be electrically, hydraulically, manually, etc. actuated. A platen 104 can be used to accept the parts 110 bearing skin 118 and transfer the skinned parts. As previously mentioned, in an alternative exemplary embodiment, the platen 104 can be used as a pusher to push the parts 110 through the unipipe 106 and the platen 102 can be used to accept the parts 110 bearing skin 118 and transfer the skinned parts. The manifold 108 can transiently hold the unipipe and distribute the skin cement uniformly around the unipipe interior to ensure a uniform flow front to the outer surface of the captive part 110, being skinned. FIG. 2A is a vertical elevational cross section (at a-a of FIG. 2B), and FIG. 2B is a horizontal cross section (at b-b of FIG. 2A).

Figure 3:
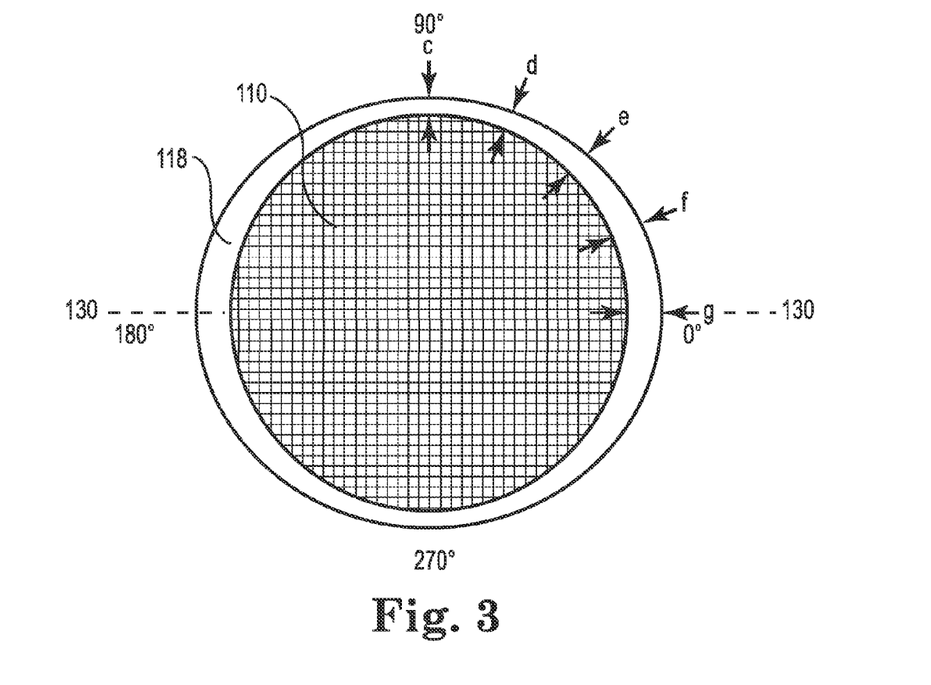
FIG. 3 demonstrates global non-uniform skin thickness according to comparative examples.

FIG. 3 demonstrates global non-uniform skin thickness according to comparative examples. In axial skinning the delivery of the cement 122 to the peripheral outer surface of the part to be skinned 110 should be uniform in the azimuthal (circumferential) direction. When the manifold design is not optimized properly, it may result in global non-uniform supply of skin cement 122 to the substrate outer peripheral surface resulting in non-uniform skin thickness. If the cement 122 is supplied through two manifold inlets 130, with un-optimized design (comparative examples), more material (cement 122) and hence thicker skin 118 will be disposed along 0° (proximate a first inlet 130) and 180° (proximate a second inlet 130), and thinner skin 118 will be disposed along 90° and 270° distant from the inlets 130. The comparative example shown schematically in FIG. 3 exhibited skin thickness from 90° to 0° of c<d<e<f<g around the outer peripheral surface. For example, c may be 1 mm, d may be 1.2 mm, e may be 1.3 mm, f may be 1.5 mm, and g may be 1.6 mm. Under such global non-uniform skin thickness, drying cracks and non-uniform stresses may develop resulting in premature failure in service, and/or additional process steps needed in packaging.

Figure 4A:
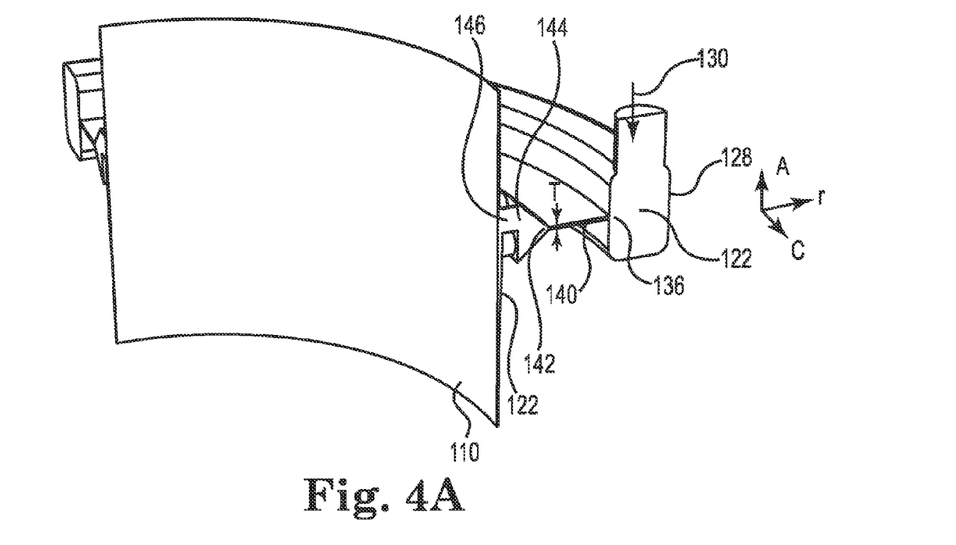
FIGS. 4A and 4B illustrate cement flow in a circumferentially curved adaptive pipe, land channel, land chamber, unipipe through holes to contact a substrate according to exemplary embodiments of the disclosure.
Figure 4B:
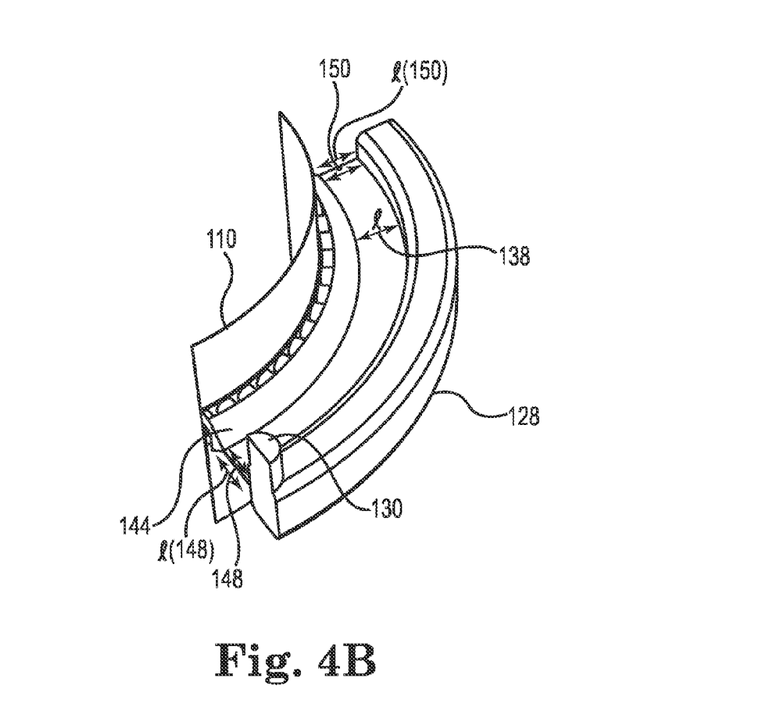

FIGS. 4A and 4B illustrate cement flow in a circumferentially curved adaptive pipe 128, land channel 140, land chamber 144, and unipipe through-holes 146 to contact a substrate outer peripheral surface 110 with skinning cement 122 according to exemplary embodiments of the disclosure.

The inlet 130 to the adaptive pipe 128 is shown as above the adaptive pipe elevation, but the inlet 130 could be from below or radially at an elevation without departing from the exemplary embodiments. The adaptive pipe 128 cross section is shown as rectangular with rounded corners, but the cross section can be various shapes without departing from the exemplary embodiments. The adaptive pipe 128 includes adaptive opening 136 along an inner sidewall. The land 138 is disposed circumferentially inward from the adaptive pipe 128. The skin cement 122 flows circumferentially through the adaptive pipe 128 and radially in the negative radial direction "r" through the adaptive pipe opening 136 into the land channel 140. The land channel 140 has a thickness in the axial direction "T" and a length in the radial direction "l". By control of thickness "T" and/or length "l" from a position 148 proximate inlet 130 to a position 150 distant from inlet 130, skinning cement 122 emitted from the land channel 140 can have the same flow velocity along the entire land opening 142 to contact the outer peripheral surface of the part 110, depositing a uniform skin 118 thereon. The land opening 142 may emit skinning cement 122 into the land chamber 144 and into the interior of the unipipe 106 via the through-holes 146 before the skinning cement 122 contacts the outer peripheral surface of the part 110, depositing a uniform skin 118 thereon.

The part 110 can move axially past the land opening 142 receiving the skinning cement 122 stuck to the outer peripheral surface by predetermined pressure. The skin 118 can be uniform in the azimuthal direction because it is emitted at the land opening 142 at a uniform velocity. Similarly, the skin 118 can be uniform in the axial direction because the relative axial velocity between the part 110 and the manifold 108 is constant.

Figure 5:
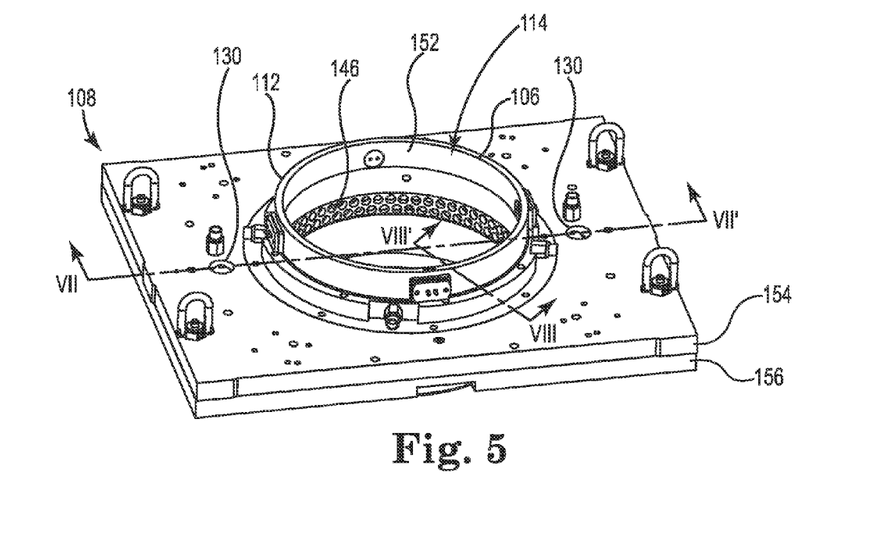
FIG. 5 shows a perspective view from above of an axial skinning manifold and a unipipe of a skinning apparatus according to exemplary embodiments of the disclosure.

FIG. 5 shows a perspective view from above of an axial skinning manifold and a unipipe of a skinning apparatus according to exemplary embodiments of the disclosure. The unipipe 106 includes sidewall 112, opening 114, and through-holes 146 to receive skinning cement 122 to the interior of the unipipe. The interior surface 152 of unipipe 106 receives the skinning cement 122 and presses the skinning cement 122 to the outer peripheral surface of the part to be skinned 110 in the unipipe 106. The manifold 108 connected to the unipipe 106 includes an upper section 154 having adaptive pipe inlets 130 and a lower section 156 connected to the upper section 154. The upper section 154 and lower section 156 may be machined, cast and machined, cast plates, separately or integrally molded, separately or integrally 3D printed, and the like. The upper section 154 and lower section 156 may be integral or include additional sections and are not limited to the exemplary embodiments described herein. The unipipe 106 and manifold 108 are described in more detail with reference to FIGS. 6, 7, and 8.

Figure 6:
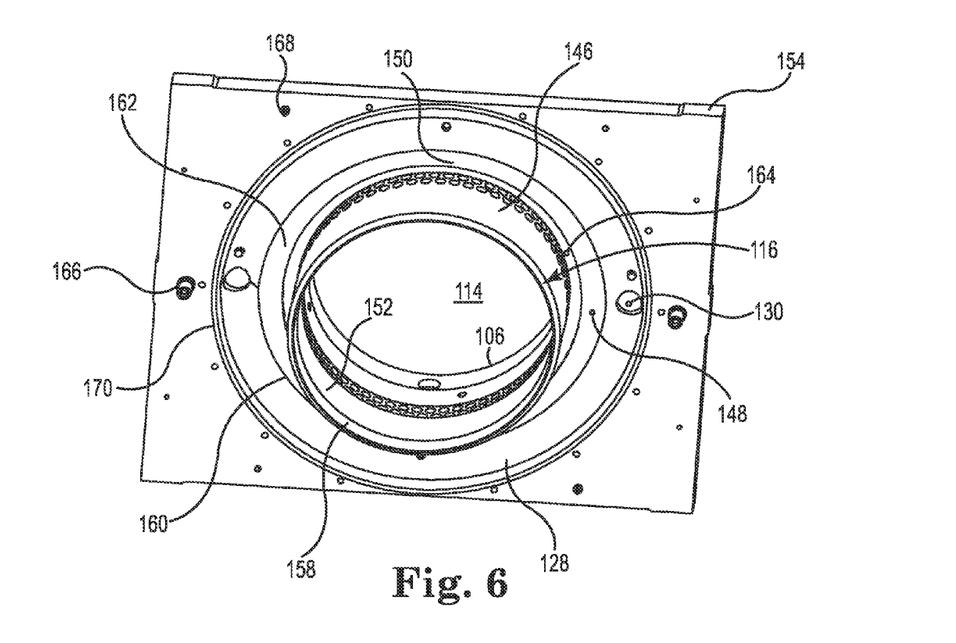
FIG. 6 shows a perspective view from below of exemplary embodiments of an upper section of the axial skinning manifold and the unipipe of the skinning apparatus of FIG. 5.

FIG. 6 shows a perspective view from below of exemplary embodiments of an upper section 154 of the unipipe 106 and the axial skinning manifold 108 of the skinning apparatus 100 of FIG. 5. The unipipe 106 may have a finishing edge 158 at the exit of the tailpipe 116 to impart a smooth finish to the skin 118 on the part 110. The manifold upper section 154 can include an upper portion of the adaptive pipe 128, a sidewall 160 at the adaptive pipe opening 136 along the inner circumference of the adaptive pipe 128, and a land channel upper surface 162 that extends from the adaptive opening 136 to the through-holes 146 of the unipipe 106. As can be seen in FIG. 6, the land channel upper surface 162 extends a greater distance proximate the inlet 130, that is, near position 148, than it does distant from the inlet 130, that is, near position 150. The land chamber 144 may have an upper surface 164 defined by the upper section 154. Fasteners 166, guide pins 168, and O-rings 170, as well as openings, grooves, holes, etc. to accept the same may further be included to connect the upper and lower sections 154, 156, and the unipipe 106.

Figure 7:
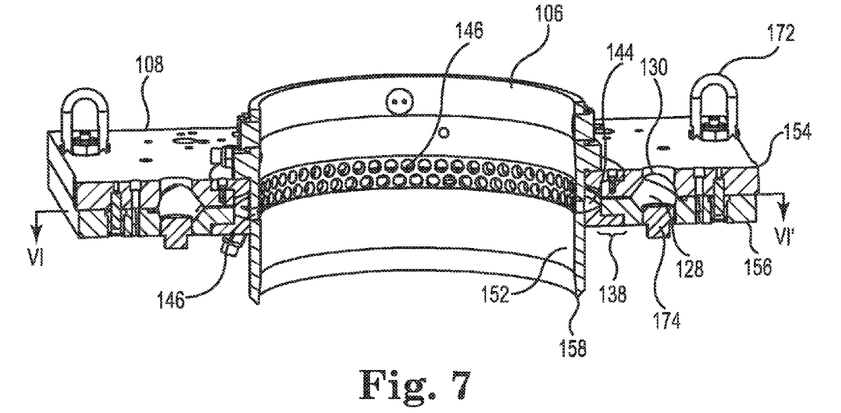
FIG. 7 shows a perspective section view of exemplary embodiments of an adaptive pipe having an adaptive opening, land channel, land opening, land chamber, unipipe through-holes and unipipe inner surface, among other features of the skinning apparatus of FIG. 5 along line VII-VII'.

FIG. 7 shows a perspective section view of exemplary embodiments of an adaptive pipe having an adaptive opening, land channel, land opening, land chamber, unipipe through-holes and unipipe inner surface, among other features of the skinning apparatus of FIG. 5 along line VII-VII'. FIG. 7 shows the unipipe 106 connected to the manifold 108. The manifold 108 can have support members 172 to dispose the manifold 108 and unipipe 106 relative to source of motive force 102, 104, feed pipes 124, and the like. The manifold 108 upper section 154 and lower section 156 define the adaptive pipe 128, the adaptive pipe inlet 130, the land 138 and the land chamber 144 disposed at the inner circumference of the adaptive pipe 128. The adaptive pipe 128 may further include a plug 174 to close an inlet 130. The unipipe 106 connected to the manifold 108 is illustrated as having two rows of evenly spaced round through-holes 146, however this disclosure is not so limited and the through-holes may be openings, orifices, slots, etc. of any shape and distribution to uniformly distribute the skinning cement 122 to the outer peripheral surface of the part to be skinned 110.

Figure 8:
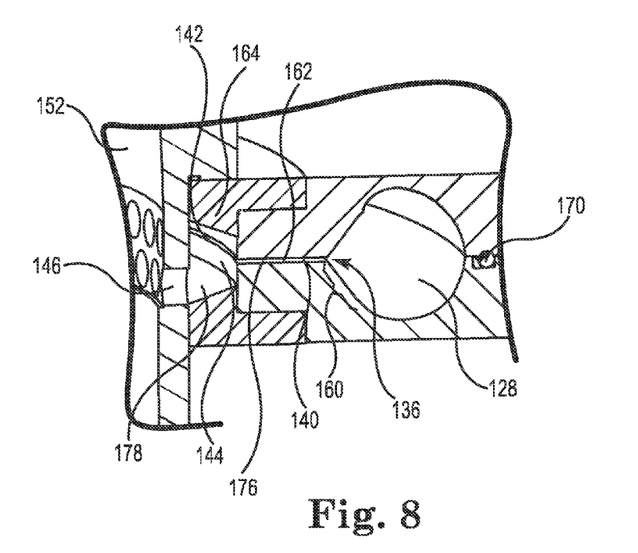
FIG. 8 shows a perspective section view of exemplary embodiments of an adaptive pipe having an adaptive opening, land channel, land opening, land chamber, unipipe through-holes and unipipe inner surface, among other features of skinning apparatus of FIG. 5 along line VIII-VIII'.

FIG. 8 shows a perspective section view of exemplary embodiments of an adaptive pipe having an adaptive opening, land channel, land opening, land chamber, unipipe through-holes and unipipe inner surface, among other features of skinning apparatus of FIG. 5 along line VIII-VIII'. Elements of the manifold 108 are shown in greater detail in FIG. 8 according to the exemplary embodiments disclosed herein. The adaptive pipe 128 is illustrated as having a generally circular cross section except near the adaptive opening 136 at the inner circumference. The adaptive pipe sidewall 160 near the adaptive opening 136 can taper toward the adaptive opening 136 as illustrated in FIG. 8. The land channel 140 can be an opening or slot extending from the adaptive opening 136 to the land opening 142 at the inner circumference of the land 138. The land channel 140 can be defined by a gap between the land channel upper surface 162 of the upper section 154 and a land channel lower surface 176 of the lower section 156.

As illustrated in FIG. 8 the land opening 142 opens into the land chamber 144. The land chamber 144 can be defined by a gap between the land chamber upper surface 164 of the upper section 154 and a land chamber lower surface 178 of the lower section 156. The land chamber 144 can open toward the through-holes 146 of the unipipe 106 as illustrated in the Figures.

EXAMPLES

Figure 9:
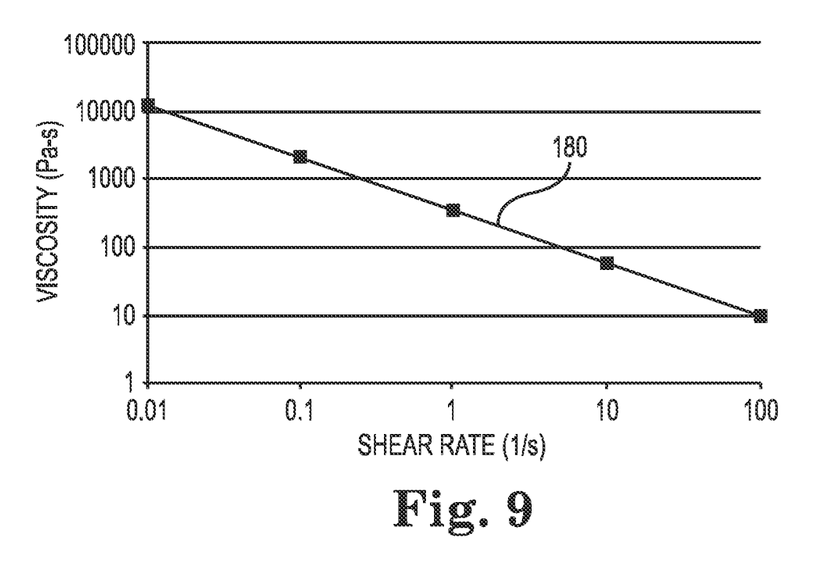
FIG. 9 represents a graphical plot of rheological skin cement property dependence of viscosity on shear rate satisfying the equation $y=mx^{-(1-n)}$.

FIG. 9 represents a graphical plot of rheological skin cement property dependence of viscosity on shear rate satisfying the equation $y=mx^{-(1-n)}$ 180. As shown in FIG. 9, the viscosity of the skin cement as a function of the shear rate can be expressed as a power law 180. Thus, the relation between stress and shear rate can be written (in cylindrical coordinates) as shown in Equation (1).

$$\tau_{rz} = m \left| \frac{\partial V_z}{\partial r} \right|^{n-1} \frac{\partial V_z}{\partial r} \tag{1}$$

Where, $\tau_{rz}$ is the shear stress, $V_z$ is the velocity in the z-direction and is a function of radial position (r), m and n are two rheological constants referred to as consistency factor and power law index respectively. Their values are obtained by fitting experimental data. For the skin cement used, m=355.15 and n=0.228 was obtained. A value of n<1 implies that the fluid is shear thinning. The proposed methodology to design the manifold can be applied to any shear thinning behavior suspension fluid.

Figure 10:
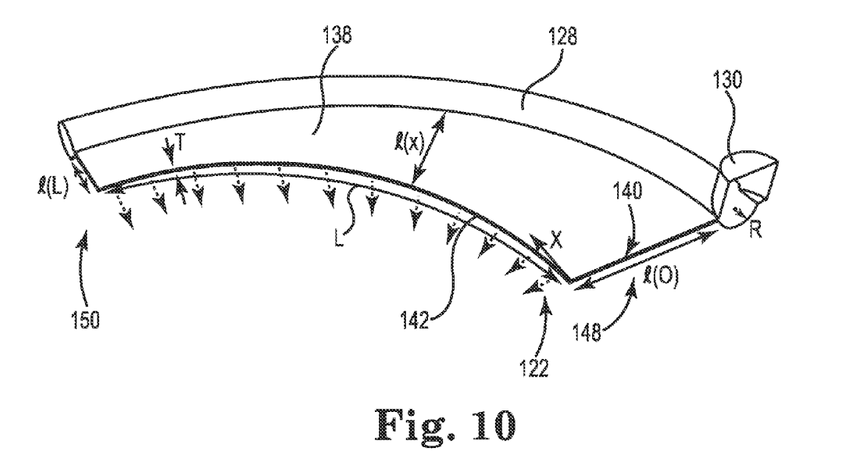
FIG. 10 shows a perspective section view of a curved adaptive pipe having an inlet and an adaptive outlet, and a land channel having thickness, length and a land outlet, among other features of a skinning apparatus according to exemplary embodiments of the disclosure.

FIG. 10 shows a perspective section view of a curved adaptive pipe having an inlet and an adaptive outlet, and a land channel having thickness, length and a land outlet, among other features of a skinning apparatus according to exemplary embodiments of the disclosure. Assuming two inlet ports 130 to feed the axial skinning cement 122 in the process, a quarter geometry of the manifold 108 is shown in FIG. 10. The flow equations are described herein based on Cartesian coordinates, where x-direction is along the circumference of the manifold exit land opening 142 and varies from 0 to "L". The following nomenclature is used: "R" is the radius of the adaptive pipe cross section assuming circular adaptive section, in this example; "m" and "n" are power law parameters; "L" is length of the manifold exit circumference, "2B" is manifold land channel 140 thickness "T"; "l(x)" is length of the manifold land channel 140, and can vary with x; "l(0)" is length of the manifold land channel 140 near the cement inlet 130.

Analytical and computational fluid dynamics (CFD) models were developed to obtain the optimized dimensions of the land 138 length. The flow rate, "Qc", through a circular pipe, of radius "R", for a power-law fluid through a distance, "L", under a pressure drop, ΔP, is given by Equation (2).

$$Q_c = \frac{\pi R^3}{\left(\frac{1}{n}\right)+3} \left(\frac{\Delta PR}{2mL}\right)^{1/n} \tag{2}$$

The flow rate, "Qs", through a slot or land channel 140 section, of thickness, "2B", and width, "W", for a power-law fluid through a distance, "l", under a pressure drop, ΔP, is given by Equation (3).

$$Q_s = \frac{2WB^2}{\left(\frac{1}{n}\right)+2} \left(\frac{\Delta PB}{ml}\right)^{1/n} \tag{3}$$

Solving Equations (2) and (3) jointly can give the velocity at the exit of the manifold 108 for a particular set of manifold dimensions and material data. Alternatively, the equations can be solved together to provide the optimum manifold dimensions that can deliver uniform flow at the exit. CFD models are developed to obtain the flow rate versus pressure drop equations for non-circular cross-sections. Similar methodology can be used to determine the velocity at the exit of the manifold, or optimum manifold dimensions.

Figure 11:
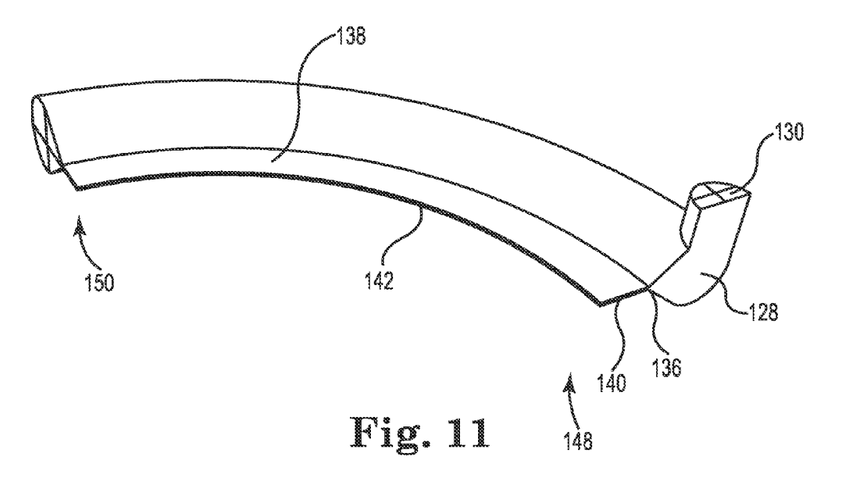
FIG. 11 shows a perspective section view of a curved adaptive pipe having an inlet and an adaptive outlet, and a land channel having thickness, length and a land outlet, among other features of a skinning apparatus according to exemplary embodiments of the disclosure.

FIG. 11 shows a perspective section view of a curved adaptive pipe 128 having an inlet 130 and an adaptive outlet 136, and a land channel 140 having thickness, length and a land outlet 142, among other features of a skinning apparatus 100 according to a comparative example of the disclosure. The land channel 140 of FIG. 11 has a uniform length. A quarter geometry of the manifold 108 with two inlet ports 130 and uniform land length is shown in FIG. 11.

Figure 12:
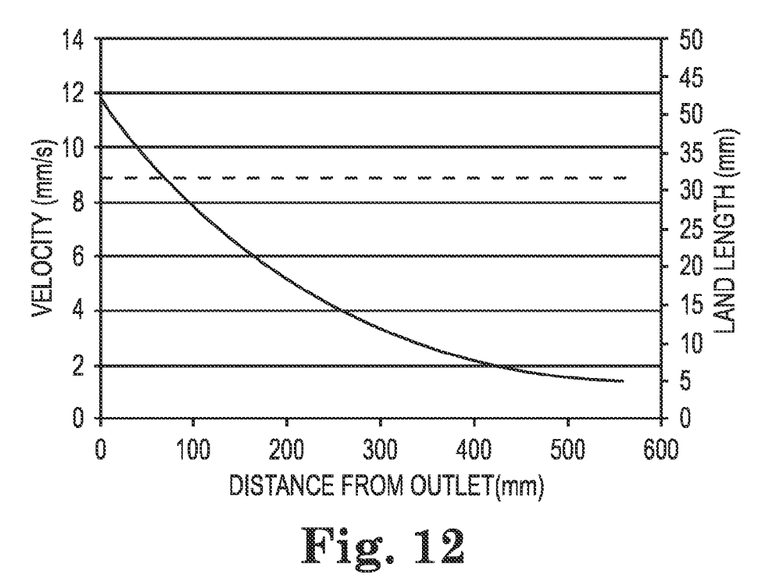
FIG. 12 represents a graphical plot of non-uniform skin cement velocity distribution at land outlet from a comparative manifold having uniform manifold land length and thickness.

There is pressure drop in the adaptive pipe 128 from inlet 130 to the opposite end 150 where skin cement 122 coming from the other inlet (not shown) will meet skin cement 122 flowing from the depicted inlet 130. Due to this pressure drop the pressure with which the skin cement 122 is being pushed through the land channel 140 will decrease away from the inlet 130 along the adaptive pipe 128, and result in higher skin cement flow rate near the inlet side 148 and a continuously decreasing flow rate away from the inlet toward the opposite end 150. FIG. 12 represents a graphical plot of non-uniform skin cement velocity distribution at land outlet 142 from the comparative manifold 108 of FIG. 11 having uniform manifold land length and thickness. FIG. 12 shows the resulting velocity distribution at the exit of the manifold (142) with uniform land length on a normalized distance plot, '0' being the inlet side 148 and '1' being the opposite side 150. Dashed line represents the land 138 length and solid line represents skin cement velocity at the land opening 142.

When Equations (2) and (3) are solved together the optimum non-uniform land length dimensions that can deliver uniform flow at the manifold exit can be obtained according to exemplary embodiments of the disclosure. With the nomenclature as above, the non-uniform land length for a circular adaptive section is given in Equation (4).

$$l(x) = \left(\frac{1+3n}{\pi R^3(1+2n)}\right)^n \left(\frac{B(2LB^2)^n}{R}\right)(nx^2 - 2Lx) + l(0) \quad (4)$$

Figure 13:
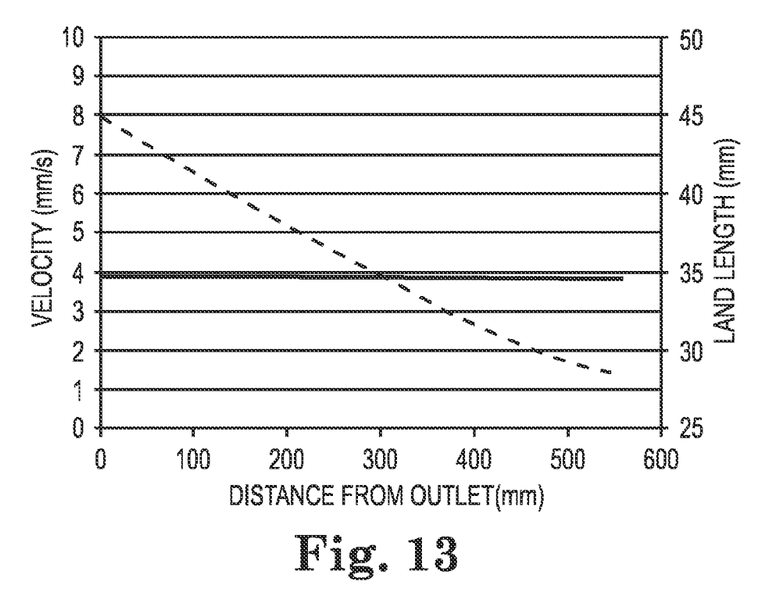
FIG. 13 represents a graphical plot of non-uniform manifold land length resulting in uniform skin cement velocity distribution at land outlet according to exemplary embodiments of the disclosure.

Referring back to FIG. 10, a quarter geometry of the manifold 108 having two inlet ports 130 with non-uniform land 138 length is shown according to exemplary embodiments of the disclosure. As in the comparative example, there is pressure drop in the adaptive pipe 128 from inlet 130 to the opposite side 150 where skin cement 122 coming from next inlet (not shown) is met. Due to this pressure drop, the pressure with which the skin cement 122 being pushed through the land channel 140 will decrease as the distance away from the inlet increases. To compensate for this pressure drop in the adaptive section 128, the length of the land 138 can be decreased moving away from the inlet 130 in such a way that the skin cement 122 comes out at a uniform flow rate from the land opening 142. FIG. 13 represents a graphical plot of non-uniform manifold land length resulting in uniform skin cement velocity distribution at land outlet 142 according to exemplary embodiments of the disclosure. Dashed line represents the land 138 length and solid line represents skin cement velocity at the land opening 142. The resulting velocity distribution at the exit of the manifold with optimized land length is shown in the normalized distance plot of FIG. 13, where '0' corresponds to the inlet side 148 and '1' corresponds to the other side 150.

Figure 14:
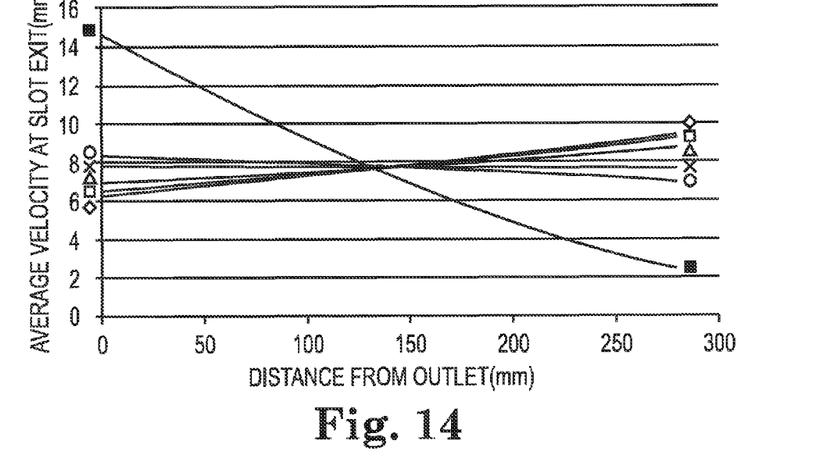
FIG. 14 represents a graphical plot of non-uniform manifold land length resulting in skin cement velocity distribution at land outlet based on material composition power law parameter "n" according to exemplary embodiments of the disclosure.

The manifold 108 performance with change in flow rate, material composition and land thickness will now be described. FIG. 14 represents a graphical plot of non-uniform manifold land length 138 resulting in skin cement velocity distribution at land outlet 142 based on material composition power law parameter "n" according to exemplary embodiments of the disclosure. In FIG. 14, (x) represents n=0.228, (■) represents n=0.1, (○) represents n=0.2, (Δ) represents n=0.3, (□) represents n=0.4, and (◇) represents n=0.5.

Figure 15:
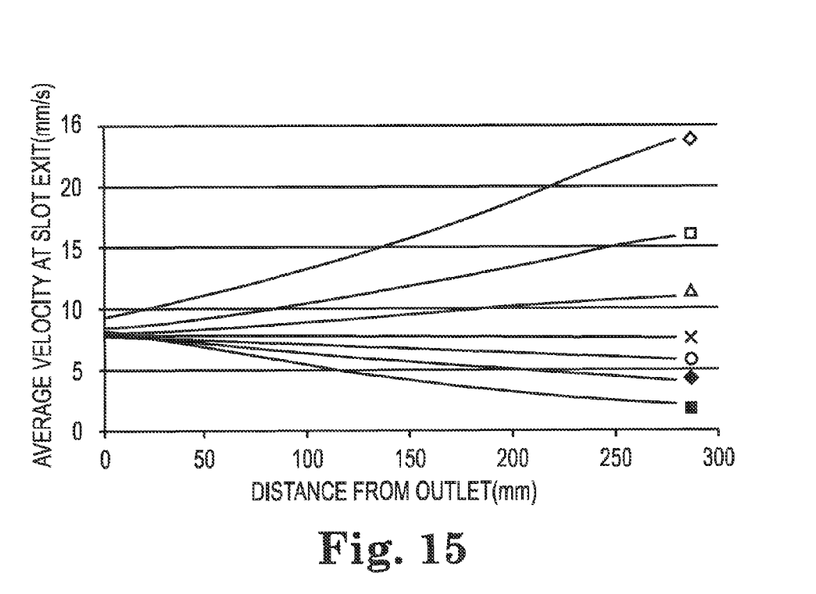
FIG. 15 represents a graphical plot of non-uniform manifold land length resulting in skin cement velocity distribution at land outlet based on land thickness "2B" according to exemplary embodiments of the disclosure.

The manifold performance is independent of the overall cement flow rate, which can be evident from the fact that flow rate did not appear in the calculation of the non-uniform land length Equation (4), above. The performance of the manifold is also independent of the power law parameter "m", but is dependent on the parameter "n". The change in velocity distribution at the exit of the manifold by changing the power law parameter 'n' from 0.1 to 0.5 can be seen in FIG. 14 for manifold initially designed for power law parameter value of n=0.28. FIG. 15 represents a graphical plot of non-uniform manifold land length resulting in skin cement velocity distribution at land outlet based on land channel thickness "2B" according to exemplary embodiments of the disclosure. The change in velocity distribution at the manifold exit by changing the land thickness "2B" from 0.75 mm to 2.5 mm is shown in FIG. 15. In FIG. 15, (◇) represents 2B=0.75 mm, (□) represents 2B=1 mm, (Δ) represents 2B=1.25 mm, (x) represents 2B=1.524 mm, (○) represents 2B=1.75 mm, (◆) represents 2B=2 mm, and (■) represents 2B=2.5 mm. By providing the capability to change the land channel thickness "2B" on the equipment by having adjustable screws or by adding shims in the land region, adjustments can be made to the land channel thickness "2B" to improve the cement flow uniformity at the exit 142 when the skin cement material composition changes.

Figure 16:
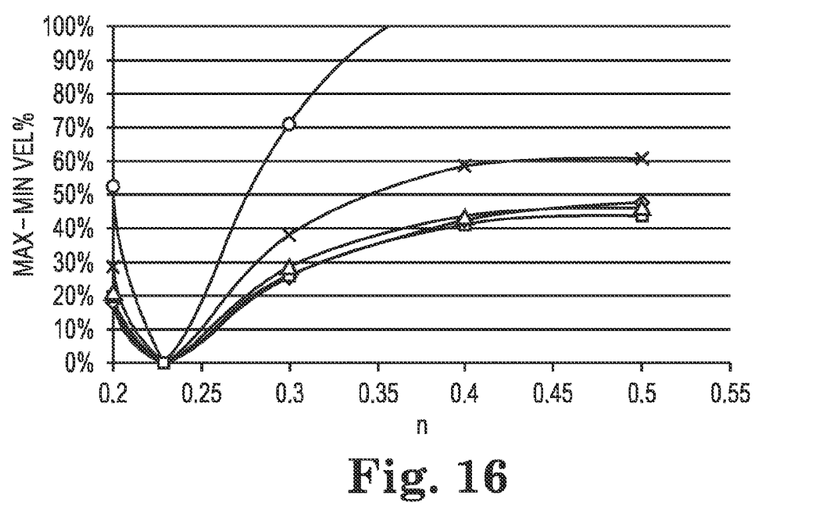
FIG. 16 represents a graphical plot of non-uniform manifold land length resulting in skin cement flow uniformity sensitivity with change in adaptive section radius based on skin cement composition according to exemplary embodiments of the disclosure.

The amount of non-uniformity introduced with the change in material composition, is dependent on the cross sectional area (for example, radius) of the adaptive region (adaptive pipe 128). The sensitivity is high at larger cross sectional areas of the adaptive region, and decreases with decreasing cross sectional area. The sensitivity appears to reach a plateau and remains constant below a radius of ~25 mm. FIG. 16 represents a graphical plot of non-uniform manifold land length resulting in skin cement flow uniformity sensitivity with change in adaptive section radius based on skin cement composition according to exemplary embodiments of the disclosure. The power law parameter "n" is on x-axis and flow non-uniformity (maximum minus minimum velocity at the manifold outlet) is on y-axis in FIG. 16. The change in flow uniformity at the manifold exit 142 by changing the value of "n" from 0.1 to 0.5 for different radii of the manifold adaptive section having the initial manifold designed for n=0.228 are shown. In FIG. 16, (◇) represents R=12 mm, (□) represents R=18 mm, (Δ) represents R=21 mm, (x) represents R=25 mm, and (○) represents R=29 mm.

Figure 17:
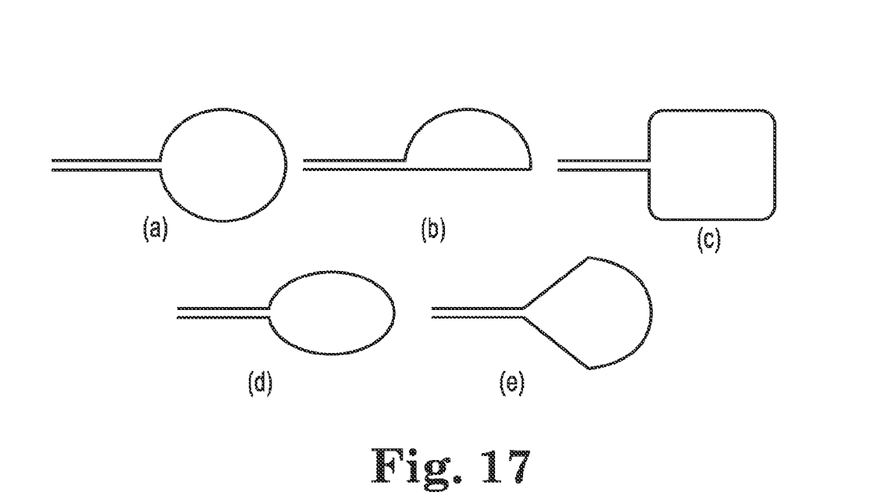
FIG. 17 shows schematic cross section geometries of adaptive pipes according to exemplary embodiments of the disclosure.

FIG. 17 shows schematic cross section geometries of adaptive pipes according to exemplary embodiments of the disclosure. Alternative designs for the adaptive section (adaptive pipe 128) can be made without departing from the exemplary embodiments of this disclosure, with the methodology described above to determine the optimum size of the land channel length and thickness. For example, as non-limiting and as shown in FIG. 17, the circular adaptive section (a) can be replaced by alternative designs, such as (b) semi-circular shape, (c) rectangular shape, (d) elliptical shape, (e) the above shapes with tangent to the land channel, or even the adaptive region itself could have non-uniform cross-section in the azimuthal direction—a representative sample is shown for uniform circular shape.

Thus, exemplary embodiments of the disclosure provide a skinning apparatus having a manifold to redistribute skinning cement from a pipe to an outer peripheral surface of a substrate along its circumference for an axial skinning process where the cement is delivered radially uniformly along the circumference of the substrate resulting in uniform skin thickness on the substrate globally.

The exemplary embodiments of the skinning apparatus provide land channel thickness adjustment, for example, when the cement material composition changes, which can redistribute the cement and alter the flow uniformity at the exit to improve skin uniformity on the part (substrate).

The exemplary embodiments of the skinning apparatus provide a non-complicated manifold having reduced dead zones and an easily cleanable configuration. The exemplary embodiments of the skinning apparatus provide a process to skin parts that reduces drying cracks, reduces stresses from skin non-uniformities, reduces premature failures of skinned parts in service from skin non-uniformities, and can reduce a packaging processing step.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of, materials, coatings, channel and filter geometry, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The methods described above are generally set forth as logical flow. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Additionally, the order in which a particular method occurs may or may not strictly adhere to the order of the corresponding steps shown.

It will be apparent to those skilled in the art that various modifications and variations can be made in the illustrated exemplary embodiments without departing from the spirit or scope of the disclosure. Thus, it is intended that the present disclosure cover the modifications and variations provided they come within the scope of the appended claims and their equivalents.

The invention claimed is:

1. A skinning apparatus, comprising:
an axial skinning manifold to apply a uniform cement skin to an outer peripheral surface of a porous ceramic, the axial skinning manifold comprising:
a curved adaptive pipe comprising a length to flow cement in a circumferential direction, an inlet to accept cement at a first position of the length, and an adaptive opening along the length to emit cement,
a land disposed along the length of the curved adaptive pipe comprising a land channel at the adaptive opening to accept the cement, the land channel extending from the adaptive opening to an inner circumference land opening to equilibrate cement pressure along the land opening and dispose the cement on the outer peripheral surface of the porous ceramic; and
a source of motive force to controllably urge the porous ceramic into and through the axial skinning manifold, wherein the land channel comprises a first thickness constant from the adaptive opening to the inner circumference land opening proximate the first position and a second thickness constant from the adaptive opening to the inner circumference land opening greater than the first thickness at a second position circumferentially spaced apart from the first position.

2. The skinning apparatus of claim 1, wherein the land channel thickness continuously varies from the first thickness proximate the first position to the second thickness greater than the first thickness at the second position.

3. The skinning apparatus of claim 1, further comprising:
a unipipe, comprising:
a first open end to accept the porous ceramic, a second open end to emit the porous ceramic with the uniform skin on the outer peripheral surface, and a sidewall extending from the first open end to the second open end, the sidewall comprising an inner surface to press cement to the outer peripheral surface of the porous ceramic, and
through-holes to pass cement from the land outlet to the inner surface to contact the outer peripheral surface of the porous ceramic, the through-holes spaced apart from the first end and the second end of the unipipe.

4. The skinning apparatus of claim 3, further comprising a land chamber to receive cement from the land outlet and emit cement to the through-holes.

5. The skinning apparatus of claim 1, wherein the curved adaptive pipe further comprises a plurality of inlets spaced evenly along the length.

6. The skinning apparatus of claim 5, wherein the plurality of inlets is two inlets spaced evenly along the length.

7. The skinning apparatus of claim 1, wherein the curved adaptive pipe length comprises a closed loop.

8. The skinning apparatus of claim 7, wherein the closed loop surrounds a unipipe comprising an elliptical, circular, square, or hexagonal cross section viewed perpendicular to axial direction, the unipipe, comprising:
a first open end to accept the porous ceramic, a second open end to emit the porous ceramic with the uniform skin on the outer peripheral surface, and a sidewall extending from the first open end to the second open end, the sidewall comprising an inner surface to press cement to the outer peripheral surface of the porous ceramic, and
through-holes to pass cement from the land outlet to the inner surface to contact the outer peripheral surface of the porous ceramic, the through-holes spaced apart from the first end and the second end of the unipipe.

9. The skinning apparatus of claim 1, wherein a cross section of the adaptive pipe, comprises a taper to the adaptive opening.

10. A skinning apparatus, comprising:
an axial skinning manifold to apply a uniform cement skin to an outer peripheral surface of a porous ceramic, the axial skinning manifold comprising:
a curved adaptive pipe comprising a length to flow cement in a circumferential direction, an inlet to accept cement at a first position of the length, and an adaptive opening along the length to emit cement,
a land disposed along the length of the curved adaptive pipe comprising a land channel at the adaptive opening to accept the cement, the land channel extending from the adaptive opening to an inner circumference land opening to equilibrate cement pressure along the land opening and dispose the cement on the outer peripheral surface of the porous ceramic; and a source of motive force to controllably urge the porous ceramic into and through the axial skinning manifold,
wherein the land comprises a first length constant from the adaptive opening to the inner circumference land opening proximate the first position and a second length constant from the adaptive opening to the inner circumference land opening less than the first length at a second circumferential position spaced apart from the first position.

\* \* \* \* \*